United States Patent
Szostek et al.

(10) Patent No.: US 9,599,184 B2
(45) Date of Patent: Mar. 21, 2017

(54) FLUID DAMPER ASSEMBLY HAVING A MULTI-FUNCTIONAL BUSHING

(71) Applicant: BEIJINGWEST INDUSTRIES CO., LTD., Beijing (CN)

(72) Inventors: Tomasz Szostek, Bielsko Biala (PL); Wojciech Battek, Krakow (PL)

(73) Assignee: Beijing West Industries Co., Ltd., Beijing (CN)

( * ) Notice: Subject to any disclaimer, the term of this patent is extended or adjusted under 35 U.S.C. 154(b) by 0 days.

(21) Appl. No.: 14/828,673

(22) Filed: Aug. 18, 2015

(65) Prior Publication Data

US 2016/0245362 A1  Aug. 25, 2016

Related U.S. Application Data

(60) Provisional application No. 62/118,789, filed on Feb. 20, 2015.

(51) Int. Cl.
*F16F 9/36* (2006.01)

(52) U.S. Cl.
CPC .................................. *F16F 9/366* (2013.01)

(58) Field of Classification Search
CPC ..... B60G 13/005; B60G 15/068; F16F 3/366; F16F 3/08; F16F 9/585; B29D 22/023
USPC .... 188/322.17, 322.12, 322.16, 322.22, 315; 188/321.11, 284; 267/113, 122, 129, 139, 267/221, 218
See application file for complete search history.

(56) References Cited

U.S. PATENT DOCUMENTS

| 3,353,813 | A | * | 11/1967 | Erdmann | ............. | B60G 13/005 |
|---|---|---|---|---|---|---|
| | | | | | | 267/218 |
| 3,385,589 | A | * | 5/1968 | Erdmann | ............. | B60G 13/005 |
| | | | | | | 267/221 |
| 4,615,537 | A | * | 10/1986 | Damon | ................... | F16F 9/366 |
| | | | | | | 188/321.11 |
| 4,974,820 | A | * | 12/1990 | Nakanishi | ................. | F16F 3/08 |
| | | | | | | 188/268 |

(Continued)

FOREIGN PATENT DOCUMENTS

| DE | 102007012070 A1 | | 9/2008 |
|---|---|---|---|
| FR | 2242604 A1 | * | 3/1975 |
| GB | 1072495 | | 6/1967 |

OTHER PUBLICATIONS

Chinese Notification of Transmittal of the International Search Report and the Written Opinion of the International Searching Authority or the Declaration; Dated Nov. 12, 2015, 12 Pages.

*Primary Examiner* — Pamela Rodriguez
(74) *Attorney, Agent, or Firm* — Dickinson Wright PLLC

(57) ABSTRACT

A fluid damper assembly including a housing that defines a chamber. A rod extends into the chamber and is axially moveable relative to the housing. A bushing is disposed about the rod and is fixed relative to the housing for guiding the rod during the axial movement of the rod. A piston is connected to the rod and is disposed in axially sliding engagement with the housing in the chamber in a compression stroke and in a rebound stroke in response to relative movement between the rod and the housing. A cushioning device extends from the bushing and biases the piston toward the compression stroke for dampening movement of the piston during the rebound stroke of the piston. The cushioning device and the bushing are integral with one another and of a homogeneous material.

16 Claims, 3 Drawing Sheets

(56) References Cited

U.S. PATENT DOCUMENTS

| | | | | |
|---|---|---|---|---|
| 5,192,057 A | * | 3/1993 | Wydra | B29D 22/023 |
| | | | | 267/122 |
| 5,467,971 A | * | 11/1995 | Hurtubise | B60G 15/068 |
| | | | | 188/322.12 |
| 5,765,666 A | | 6/1998 | Provence et al. | |
| 7,032,727 B2 | * | 4/2006 | Vanspauwen | F16F 9/585 |
| | | | | 188/282.5 |
| 2008/0012188 A1 | * | 1/2008 | Dickson | F16F 1/3732 |
| | | | | 267/139 |

* cited by examiner

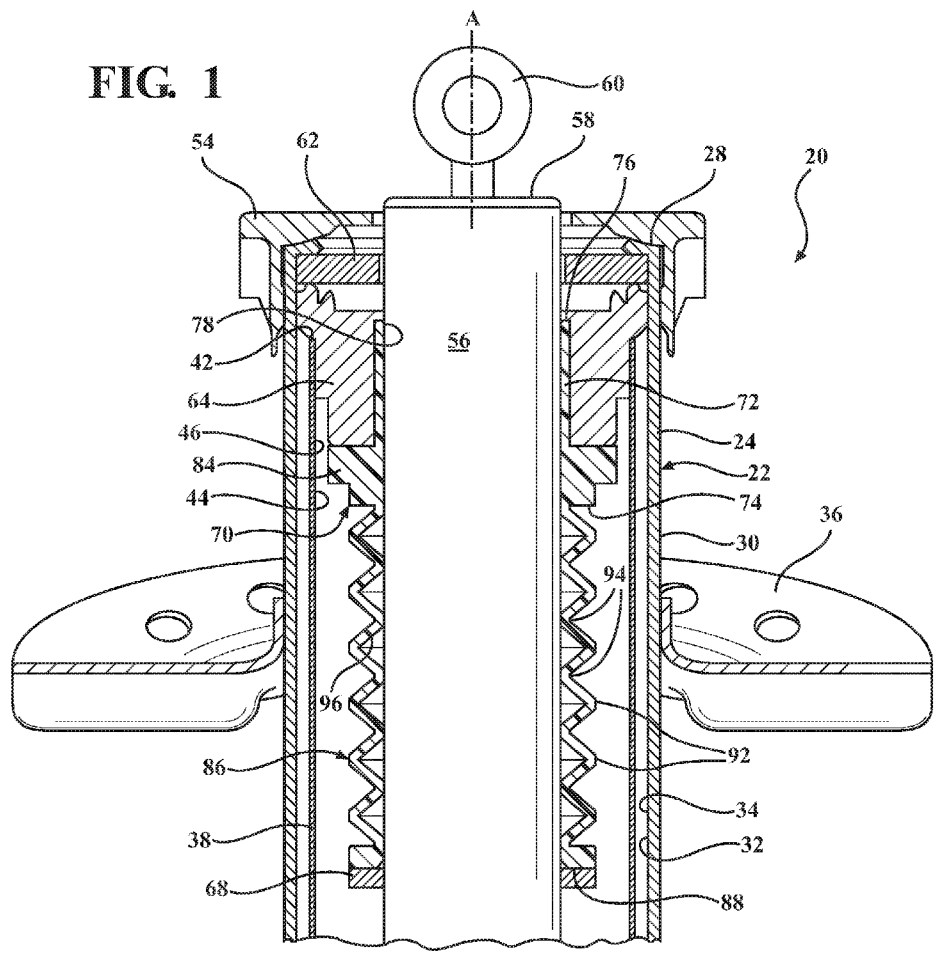
FIG. 1
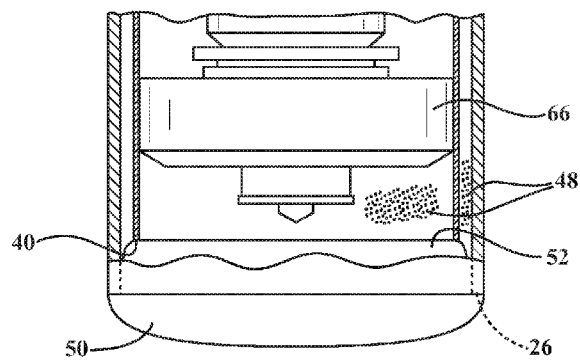

FLUID DAMPER ASSEMBLY HAVING A MULTI-FUNCTIONAL BUSHING

CROSS REFERENCE TO RELATED APPLICATION

This application claims the benefit of U.S. Provisional Patent Application Ser. No. 62/118,789 filed on Feb. 20, 2015 and titled "Fluid Damper Assembly Having a Multi-Functional Bushings".

BACKGROUND OF THE INVENTION

1. Field of the Invention

A fluid damper assembly for dampening vibrations between a frame and a wheel assembly of a vehicle.

2. Description of the Prior Art

Fluid damper assemblies, i.e., shock absorbers, of the type to which the subject invention pertains are known in the art for use in suspension systems of vehicles, such as automobiles, to dampen vibrations between the frame and wheel assembly of the vehicle. An example of a fluid damper assembly is disclosed in U.S. Pat. No. 7,032,727 to Vincent Vanspauwen. The fluid damper assembly includes a housing that defines a chamber. A rod extends into the chamber and is axially moveable relative to the housing. A bushing is disposed about the rod and is fixed relative to the housing for guiding the rod during the axial movement of the rod. A piston is connected to the rod and is disposed in axially sliding engagement with the housing in the chamber in a compression stroke and in a rebound stroke in response to relative movement between the rod and the housing. A cushioning device i.e., spring, extends from the bushing and biases the piston toward the compression stroke for dampening movement of the piston during the rebound stroke of the piston.

The bushing and spring of such conventional fluid damper assemblies are typically made of relatively expensive, high mass materials and require numerous, relatively complex manufacturing steps to be installed onto the fluid damper assembly. Accordingly, there remains a need for improvements to such fluid damper assemblies.

SUMMARY AND ADVANTAGES OF THE INVENTION

The subject invention provides for such a fluid damper assembly wherein the cushioning device and bushing are integral with one another and of a homogeneous material.

The subject invention therefore provides a fluid damper assembly that consists of few assembled components and thus requires few manufacturing steps to produce and has a reduced likelihood of failure. More specifically, because of the integral and homogenous material design of the bushing and cushioning device, they may be made of inexpensive, lightweight and strong materials and may be produced via simple and consistent manufacturing processes, thereby reducing material and manufacturing costs, and making them less prone to failure during operation.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a side cross-sectional view of a fluid damper assembly according to an aspect of the disclosure;

FIG. 2A is a side cross-sectional view of the bushing and cushioning device of FIG. 2 taken along line 2A-2A of FIG. 2.

DESCRIPTION OF THE ENABLING EMBODIMENT

Figure 2:
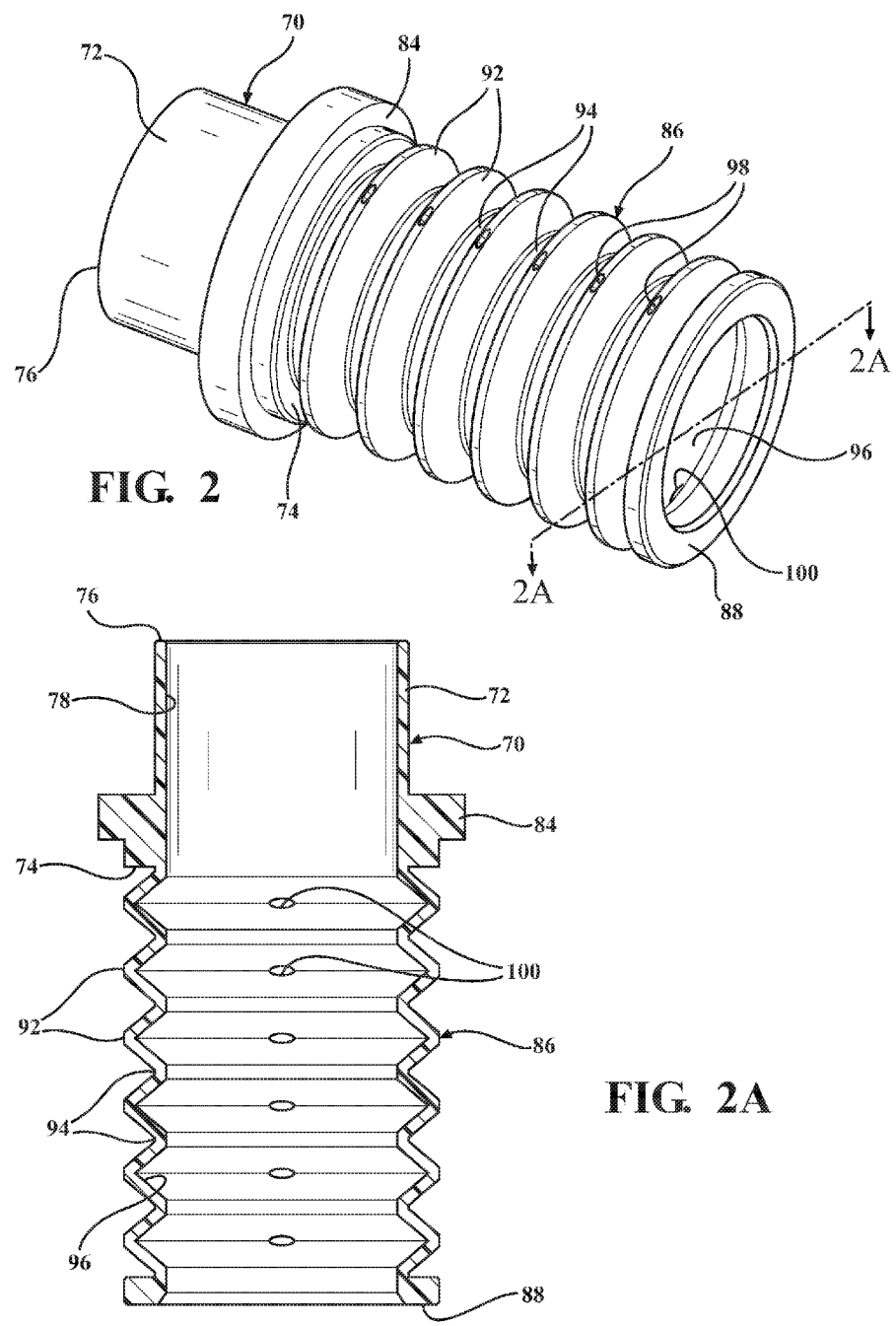
FIG. 2 is a perspective view of a bushing and cushioning device that are integral with one another and of a homogenous material according to an aspect of the disclosure.

Referring to the figures, wherein like numerals indicate corresponding parts throughout the several views, a fluid damper assembly 20 is generally shown for dampening vibrations between a frame and a wheel assembly of a vehicle. It should be appreciated that the fluid damper assembly 20 could be utilized on various types of vehicles including, but not limited to, automobiles, motorcycles and all-terrain vehicles.

With reference to FIG. 1, the fluid damper assembly 20 includes a housing 22 that has a reservoir tube 24 that extends about and along a center axis A between a bottom end 26 and a top end 28 and presents an outer surface 30 and an inner surface 32 that defines a reservoir chamber 34. A mounting ring 36 is disposed about and is connected to the outer surface 30 of the reservoir tube 24 for connecting the housing 22 to the frame of the vehicle. It should be appreciated that other types of connection mechanisms could be utilized to connect the housing 22 to the frame without departing from the scope of the subject disclosure. For example, the mounting ring 36 could be connected to the bottom end 26 rather than outer surface 30 of the reservoir tube 24.

The housing 22 further includes a pressure tube 38 that is disposed in the reservoir chamber 34 and extends coaxially with the reservoir tube 24 along the center axis A between a lower end 40 and an upper end 42. The pressure tube 38 has an interior surface 44 that defines a working chamber 46. An incompressible fluid 48 such as a conventional hydraulic oil is disposed in the reservoir and working chambers 34, 46.

A bottom end cap 50 is connected to and seals the bottom end 26 of the reservoir tube 24. Further, a base valve assembly 52 is connected to the lower end 40 of the pressure tube 38 in the reservoir chamber 34. The base valve assembly 52 fluidly connects the reservoir and working chambers 34, 46 for controlling the flow of the fluid between the reservoir and working chambers 34, 46 during operation of the fluid damper assembly 20.

An upper end cap 54 is connected to the top end 28 of the reservoir tube 24 and closes the reservoir chamber 34 at the top end 28. A rod 56 extends through the upper end cap 54 into the working chamber 46 and is axially moveable relative to the housing 22. The rod 56 has a connection end 58 disposed outside of the housing 22. A mounting band 60 is connected to the connection end 58 for being connected to the wheel assembly of the vehicle. It should be appreciated that alternatively, the mounting ring 36 could be connected to the wheel assembly and the mounting band 60 could be connected to the frame of the vehicle without departing from the scope of the subject disclosure. An upper seal 62 is disposed and sealed about the rod 56 adjacent to the upper end cap 54 for preventing fluids from escaping the housing 22 along the rod 56. A body member 64 is disposed about the rod 56 in axial abutment with the upper seal 62 for supporting the rod 56 during the axial movement of the rod 56. The upper end 42 of the pressure tube 38 is connected and sealed to the body member 64 radially outwardly from the rod 56.

A piston 66 is disposed in the working chamber 46 and is connected to the rod 56. The piston 66 is in axial sliding engagement with the interior surface 44 of the pressure tube 38 of the housing 22 in a compression stroke toward the lower end 40, and in a rebound stroke toward the upper end 42 in response to relative movement between the rod 56 and the housing 22.

A collar 68 is fixedly disposed about the rod 56 in axially spaced relationship with the piston 66 and the connection end 58 of the rod 56. In the exemplary embodiment, the collar 68 has a ring shape, however, it should be appreciated that it could have other shapes, e.g., a square cross-sectional shape, without departing from the scope of the subject disclosure.

A bushing 70 is disposed about the rod 56 in the working chamber 46 adjacent to the connection end 58 of the rod 56 and is fixed relative to the housing 22. The bushing 70 helps guide the rod 56 during the axial movement of the rod 56, supports the rod 56 against lateral forces, and acts as a heat insulating layer between the rod 56 and the body member 64.

Figure 3:
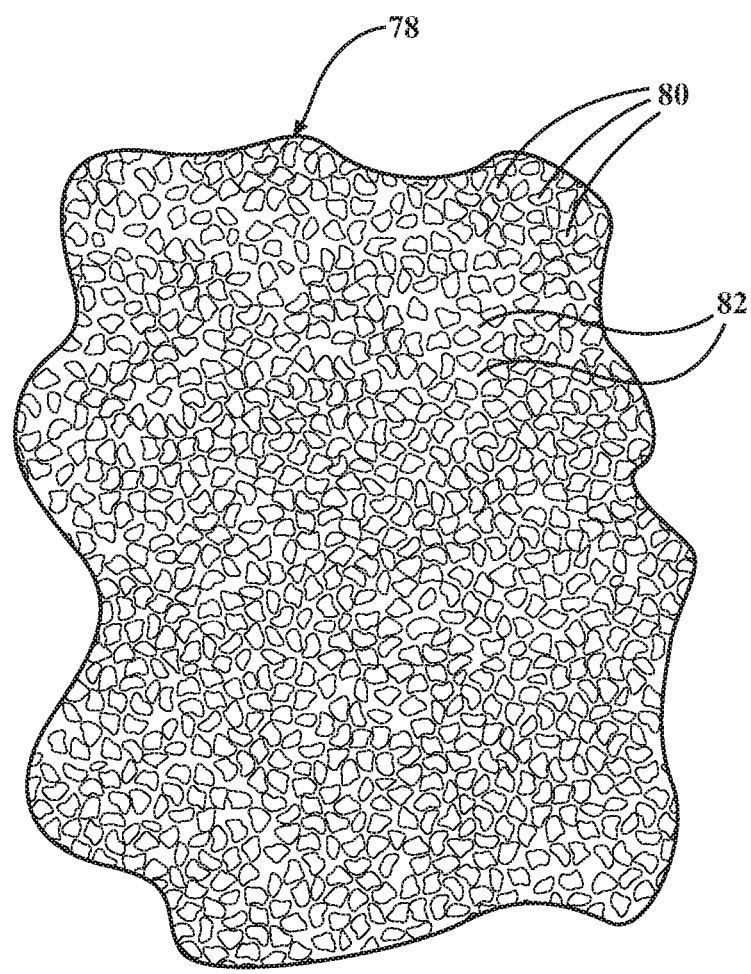
FIG. 3 is a side view of an inner surface of a bushing illustrating a plurality of raised portions and sunken portions for holding lubricating oil.

As best presented in FIGS. 1-2A, the bushing 70 includes a tube-shaped drum 72 that extends between a first end 74 and a second end 76 and is disposed radially between the body member 64 and the rod 56. The drum 72 has an inside surface 78 that is in sliding engagement with the rod 56. As best presented in FIG. 3, the inside surface 78 presents a plurality of raised portions 80 and a plurality of sunken portions 82 for holding a lubricant therebetween to reduce friction between the inside surface 78 and the rod 56. Said another way, the inside surface 78 has an "orange peel" texture which acts as a labyrinth for lubricating oil to be disposed to reduce the friction created during relative movement between the bushing 70 and the rod 56. Further, with reference back to FIGS. 1-2A, the inside surface 78 has a generally circular cross-sectional shape and extends continuously about the axis A. Said another way, the inside surface 78 extends in a cylindrical shape with no breaks in continuity.

It should be appreciated that the friction-reducing texture and continuously circular shape of the inside surface 78 of the drum 72 provide even distribution of lubricating oil about the rod 56. This is an improvement over conventional prior art bushings 70 which are typically formed by way of a steel belt rolling processes, and often have an imperfect circular shaped inside surface 78 that is not textured, as well as an axially extending groove (which may have varying depths and widths) defined by the inside surface 78. These characteristics are known to cause uneven distribution of lubricating oil about the rod 56 leading to scratching of the rod 56. Thus, it should be appreciated that the even distribution of lubricating oil about the rod 56 provided by of the subject invention provides for reduced scratching of the rod 56 during operation of the fluid damper assembly 20. It should be appreciated, that the inside surface 78 could alternatively be made without the textured surface.

The bushing 70 further includes a rebound bumper 84 that extends radially outwardly from the drum 72 adjacent to the first end 74 of the drum 72 for limiting movement of the piston 66 during the rebound stroke of the piston 66. Further, a cushioning device 86 extends from the first end 74 of the drum 72 to a terminal end 88 that is in abutting relationship with the collar 68 for axially biasing the piston 66 toward the lower end 40 of the pressure tube 38 to dampen movement of the piston 66 during the rebound stroke. It should be appreciated that the terminal end 88 of the cushioning device 86 could alternatively engage the piston 66 directly.

The cushioning device 86 and the bushing 70 are integral with one another and of a homogenous material. It should be appreciated that making the bushing 70 and cushioning device 86 integral and of a homogenous material provides for numerous advantages. For example, the fluid damper assembly 20 requires fewer assembled components, thus requiring fewer manufacturing steps to produce and reducing the likelihood of failure of components of the damper assembly. Additionally, it allows the bushing 70 and cushioning device 86 to be made of lightweight, inexpensive and strong materials such as organic polymer materials and composites. Utilizing these materials allows the bushing 70 and cushioning device 86 to be produced via relatively simple and consistent processes such as, but not limited to injection molding. In an exemplary embodiment, a composite material is utilized which consists of polymide with reinforcement fiberglass. It should be appreciated that other materials could be utilized.

Being able to utilize injection molding processes to make the bushing 70 allows the bushing 70 to easily be formed with a constant, circular inside surface 78. Additionally, the bushing 70 may easily be made with various outer diameters. Furthermore, being able to utilized composite materials allows the bushing 70 to function at wide working temperature ranges.

In the exemplary embodiment, the cushioning device 86 generally has a tube shape and a presents a plurality of corrugations 92, 94 that extend axially from the bushing 70 toward the terminal end 88. The corrugations 92, 94 are defined by a plurality of peaks 92 and valleys 94, with the peaks 92 disposed radially outwardly from the valleys 94. Furthermore, the cushioning device 86 defines a cavity 96 radially inward from the corrugations 92, 94.

A plurality of holes 98, 100 are defined along the corrugations 92, 94 in spaced relationship with one another for allowing fluid to flaw through the holes 98, 100 into and out of the cavity 96 as the cushioning device 86 is compressed and decompressed during axial movement of the piston 66. In the exemplary embodiment, the holes 98, 100 are defined by the peaks 92 to allow the fluid to flow through the holes 98, 100 during compressing of the cushioning device 86. It should be appreciated that if the holes 98, 100 were defined by the valleys 94, the holes 98, 100 could become sealed during compression of the biasing device, which could lead to damaging of the biasing device. It is anticipated that the holes 98, 100 could alternatively also be defined by the valleys 94 in addition to the peaks 92. The plurality of holes 98, 100 includes a set of first holes 98 and a set of second holes 100. The first and second sets of holes 98, 100 are defined on diametrically opposite sides of the axis A from one another. Further, the holes 98, 190 of each of the sets of holes 98, 100 are disposed in axial alignment with one another to provide simplicity in manufacturing the cushioning device 86. It is anticipated, however that the holes 98, 100 could be defined in other arrangements.

It should be appreciated that the spring rate and damping force applied by the cushioning device 86 can be adjusted by changing the material density, the number of corrugations 92, 94, the free length of the cushioning device 86, and the quantity and diameter of the holes 100, 98.

It should also be appreciated that the integral bushing 70 and cushioning device 86 as described herein could alternatively be utilized on a mono-tube style damper.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A fluid damper assembly for dampening vibrations between a frame and a wheel assembly of a vehicle, said fluid damper assembly comprising:
   a housing defining a chamber and disposed on a center axis,
   a rod extending into said chamber and axially moveable relative to said housing,
   a bushing disposed about said rod and fixed relative to said housing for guiding said rod during said axial movement of said rod,
   a piston connected to said rod disposed in axially sliding engagement with said housing in said chamber in a compression stroke and in a rebound stroke in response to relative movement between said rod and said housing,
   a cushioning device extending from said bushing and biasing said piston toward said compression stroke for dampening movement of said piston during the rebound stroke of said piston,
   said cushioning device and said bushing being integral with one another and of a homogeneous material,
   said cushioning device presenting a plurality of corrugations and defining a cavity,
   said cushioning device defining a plurality of holes spaced from one another to allow fluid to flow through said holes into and out of said cavity as said cushioning device being compressed and decompressed during axial movement of said piston,
   said corrugations being defined by a plurality of peaks and valleys with said peaks disposed radially outwardly from said valleys,
   said holes being defined by said peaks to allow the fluid to flow through said holes during compressing of said cushioning device.

2. A fluid damper assembly as set forth in claim 1 wherein said cushioning device has a generally tube shape.

3. A fluid damper assembly as set forth in claim 1 wherein an incompressible fluid is disposed in said chamber.

4. A fluid damper assembly as set forth in claim 1 wherein said holes are in axial alignment with one another.

5. A fluid damper assembly as set forth in claim 4 wherein said holes include a plurality of first holes and a plurality of second holes with said first holes and second holes defined on diametrically opposite sides of said center axis from one another.

6. A fluid damper assembly as set forth in claim 1 wherein said homogeneous material is an organic polymer material.

7. A fluid damper assembly as set forth in claim 1 wherein said homogenous material is a composite material.

8. A fluid damper assembly as set forth in claim 1 wherein said bushing has an inside surface in sliding engagement with said rod.

9. A fluid damper assembly as set forth in claim 8 wherein said inside surface presents a plurality of raised portions and a plurality of sunken portions for holding a lubricant in said sunken portions to reduce friction between said inside surface and said rod.

10. A fluid damper assembly as set forth in claim 9 wherein said inside surface has a generally circular shape and extends continuously about said axis.

11. A fluid damper assembly as set forth in claim 1 wherein said bushing includes a drum portion having a tube shape and disposed about said rod and extending between a first end and a second end, and said bushing further includes a rebound bumper extending radially outwardly from said drum adjacent to said first end of said drum for limiting movement of said piston.

12. A fluid damper assembly as set forth in claim 11 wherein said cushioning device extends axially from said first end of said drum to a terminal end.

13. A fluid damper assembly as set forth in claim 12 further including a collar fixedly disposed about said rod and in abutting relationship with said terminal end of said cushioning device with said cushioning device biased against said collar for damping movement of said piston.

14. A fluid damper assembly for dampening vibrations between a frame and a wheel assembly of a vehicle, said fluid damper assembly comprising:
   a housing defining a chamber and disposed on a center axis,
   a rod extending into said chamber and axially moveable relative to said housing,
   a bushing disposed about said rod and fixed relative to said housing for guiding said rod during said axial movement of said rod,
   a piston connected to said rod disposed in axially sliding engagement with said housing in said chamber in a compression stroke and in a rebound stroke in response to relative movement between said rod and said housing,
   a cushioning device extending from said bushing and biasing said piston toward said compression stroke for dampening movement of said piston during the rebound stroke of said piston,
   said cushioning device and said bushing being integral with one another and of a homogeneous material,
   said cushioning device presenting a plurality of corrugations and defining a cavity,
   said cushioning device defining a plurality of holes spaced from one another to allow fluid to flow through said holes into and out of said cavity as said cushioning device is compressed and decompressed during axial movement of said piston,
   said holes being in axial alignment with one another,
   said holes including a plurality of first holes and a plurality of second holes with said first holes and second holes defined on diametrically opposite sides of said center axis from one another.

15. A fluid damper assembly as set forth in claim 14 wherein said corrugations are defined by a plurality of peaks and valleys with said peaks disposed radially outwardly from said valleys.

16. A fluid damper assembly as set forth in claim 15 wherein said holes are defined by said peaks to allow the fluid to flow through said holes during compressing of said cushioning device.

* * * * *

UNITED STATES PATENT AND TRADEMARK OFFICE
CERTIFICATE OF CORRECTION

| | |
|---|---|
| PATENT NO. | : 9,599,184 B2 |
| APPLICATION NO. | : 14/828673 |
| DATED | : March 21, 2017 |
| INVENTOR(S) | : Tomasz Szostek et al. |

It is certified that error appears in the above-identified patent and that said Letters Patent is hereby corrected as shown below:

In the Specification

Column 1, Line 10 "Bushings" should read -- Bushing --

Column 4, Line 40 "flaw" should read -- flow --

Column 4, Line 55 "190" should read -- 100 --

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*